3,168,475
WELL-WORKING FLUIDS

John W. Jordan, Michael J. Nevins, Robert O. Stearns, Jack C. Cowan, and Augustus Earl Beasley, Jr., all of Houston, Tex., assignors to National Lead Company, New York, N.Y., a corporation of New Jersey
No Drawing. Filed Mar. 15, 1961, Ser. No. 95,794
12 Claims. (Cl. 252—8.5)

This invention relates to oil base fluids for use in well-working operations, such as drilling, fracturing, packing, and the like, and more particularly, includes novel types of oil base drilling fluids, oil base fracturing fluids, and the like.

In the rotary drilling of wells for oil and gas, drilling fluids are used which are circulated in such a manner as to remove cuttings and to support the walls of the hole. Most commonly such fluids are water base, comprising, for example, clay dispersed in water, but in recent years extensive use has been made of fluids having oil as the base, i.e., the continuous liquid vehicle.

The oily vehicle is converted into a drilling fluid having suitable properties for the task by adding various materials to thicken the oil so that it will support cuttings, to provide a low fluid loss when the fluid is subjected to filtration against a permeable formation, and in some cases to increase the density of the fluid. Our invention, to be more particularly described below, offers greatly improved fluids of this general type, and we have found that the fluids of our invention are also useful in certain other types of well-working operations. For example, oil bearing sands of low permeability are commonly subjected to extremely high fluid pressures so as to crack them open, generally along bedding planes, and the fractures so formed are held open by solid propping agents introduced with the fracturing fluid. In this use also, it is desirable to employ an oil base fluid having a low filtration loss. Again, it is many times necessary to fill the annular space between the casing and the walls of the hole. Here likewise, it is advantageous to use an oily liquid so as to minimize corrosion, and to provide low fluid loss properties so that the packing fluid remains in place over a long period of time. As mentioned hereinabove, these operations, viz., drilling, fracturing and packing, are well-working operations; and these fluids, viz., oil base well-drilling fluids, oil base well-fracturing fluids, and oil base well-packing fluids, are termed "oil base well-working fluids," elsewhere in this specification and in the claims which follow.

In the earlier development of oil base fluids of the types described, primary attention was given to providing thickening additives. Many were found and have been used at various times, including carbon black, soaps of fatty acids, rosin, tall oil, and like organic acids, asphalts of various kinds, and so forth. In recent years, however, it has become apparent that a low fluid loss is the most important characteristic of these fluids to be sought for, and that thickening to whatever degree desired can generally be readily accomplished by any of several means, provided that the fluid loss is maintained at a very small value. The fluids in accordance with our invention are characterized by extremely low filter loss, and the additives which we use in practicing our invention are of such a nature that undue thickening does not set in before the fluid loss is lowered to a satisfactory level, as more and more of the additive is introduced, all as set forth in greater detail hereinbelow.

An object of our invention, accordingly, is to provide well-working fluids comprising an oil base and containing an additive which serves to lower the filter loss to extremely low values.

Another object of our invention is to provide such fluids as just described which can be prepared without excessive thickening.

Another object of our invention is to provide such fluids which will retain desirable properties under conditions of extreme temperature, i.e., the fluids will have good thermal stability.

Other objects of our invention will appear as the description thereof proceeds.

Generally speaking, and in accordance with an illustrative embodiment of our invention, we treat an oily liquid, which is most desirably diesel oil but may also be any available crude oil, topped or untopped, or various fractions of crude oil, including kerosene, fuel oil, and the like with a salt of humic acid, viz., a humate, in which the cation is a substituted ammonium ion, in which one or more of the hydrogen atoms originally present in the ammonium ion is substituted by an alkyl radical, and in which at least one of the said alkyl radicals has from 12 to 22 carbon atoms in a straight chain. It will be clear from this summation that the valence positions of the nitrogen atom which are not occupied by hydrogen atoms may be either long alkyl chains, of the type just described, or may be short alkyl chains, from $C_1$ to $C_{11}$, that is, methyl through undecyl, or phenyl or benzyl radicals, as long as at least one alkyl radical is present in the range of at least $C_{12}$ to $C_{22}$, which in the methane series corresponds to dodecyl through docosyl. Compounds useful in the practice of our invention may, accordingly, be represented by the formula $R_1R_2R_3R_4N^+Hu^-$, wherein at least one of the R's is an alkyl radical having from 12 to 22 carbon atoms in a straight chain, and in which those R's which do not have from 12 to 22 carbon atoms in a straight chain are chosen from the group consisting of hydrogen, alkyl radicals having fewer than 12 carbon atoms, and phenyl and benzyl; and in which Hu is the anion of humic acid.

Humic acid is a material of wide distribution, being present in soils, peat, and coals, especially coals of the type known as lignite or brown coal. Although the exact details of its chemical structure are not completely known, it is a surprisingly uniform substance considering the variety of source materials of which it represents a natural product of degradation, such as leaves, wood, and like vegetable organic matter. It is an acid, in which both carboxyl and phenolic hydroxyl groups contribute base-combining ability. It is soluble in alkalies, such as caustic soda and sodium carbonate, has a deep brown color, and is readily soluble in water when converted to its alkali metal salt, which may be then termed an alkali metal humate, the commonest example of which is sodium humate.

As indicated, it is present in soils and peat, and may readily be extracted from these by known means, most commonly by treatment with dilute aqueous alkali. Whenever it is a matter of producing a commercial humate, that is, whenever economic considerations are of importance, then the humic acid is nearly always derived from its richest common source, which is lignite, of which there are vast deposits distributed throughout the world, including the United States, and particularly the States of North Dakota, Texas, New Mexico, and California.

By way of further explanation of the nature and types of the humic acid compounds used in the practice of our invention, we give the following table showing typical members of the series:

TABLE I

Dodecylammonium humate
Stearylammonium humate
Oleylammonium humate
Palmitylammonium humate
Docosylammonium humate
Methyldodecylammonium humate
Methylstearylammonium humate
Di-dodecylammonium humate
Laurylstearylammonium humate
Butyldocosylammonium humate
Benzyllaurylammonium humate
Dimethyllaurylammonium humate
Methyllaurylstearylammonium humate
Tri-laurylammonium humate
Diphenylstearylammonium humate
Trimethyllaurylammonium humate
Benzyldiethyldocosylammonium humate
Phenyldibutyloctadecylammonium humate
Dimethyldioctadecylammonium humate
Benzylbutyllauryloleylammonium humate
Dimethyldi-(hydrogenated tallow fatty alkyl)ammonium humate
Methyltrilaurylammonium humate
Methyltri-(hydrogenated tallow fatty alkyl)ammonium humate
1-hydroxyethyl, 2-heptadecenyl, 2-imidazolinium humate
1-benzyl, 1-hydroxyethyl, 2-heptadecyl-2-imidazolinium humate We use the term "alkyl ammonium" in the broad sense, wherein "ammonium" indicates an onium cation in which the basic atom is pentavalent nitrogen. Thus the term includes substituted ammonium cations in which two or more of the substituted positions may form part of a ring, as is the case in the imidazolinium compounds listed above. It will be further understood that the above listing is illustrative and by no means exhaustive.

Generally speaking, the humate compounds for use in our invention may be produced by bringing together humic acid and the alkyl ammonium compound in its base form. The base and the acid neutralize each other with salt formation, so as to produce an alkyl ammonium humate in accordance with this aspect of the invention. Another general method of preparation is to convert the humic acid to a simple salt by reaction with an alkali, so as to produce sodium humate, potassium humate, ammonium humate, and the like, by reaction with sodium hydroxide, potassium hydroxide, or ammonium hydroxide respectively. The alkyl ammonium compound is caused to be present in the form of a simple salt. Thus, a primary, secondary, or tertiary amine may be reacted with a simple acid such as hydrochloric, acetic, and the like to give the corresponding substituted ammonium chloride or acetate, respectively. This method of procedure has the advantage that the simple substituted ammonium salts, and the simple humates as described, are both water soluble, so that solutions of each reactant may be made, and the reaction completed by mixing solutions together.

To give a simple example, octadecyl amine is treated with an equivalent quantity of acetic acid to give octadecylammonium acetate. This is then dissolved in several times its weight in water. Separately, humic acid is converted to sodium humate by treating lignite, for example, with sodium hydroxide to neutrality followed by filtering off the insoluble portion of the lignite. The solution of sodium humate thus formed is mixed with the solution of octadecylammonium acetate in stoichiometrically equivalent proportions, whereupon there occurs a quantitative precipitation of octadecylammonium humate. The equivalent weight of the humic acid can readily be determined in any known fashion applicable to acids generally, such as, for example, by titration of sodium hydroxide using an electrometric pH meter.

A somewhat special case is presented by the quaternary substituted ammonium salts, which have no free base form. A simple example is trimethyl octadecylammonium chloride. In its quaternary salt form, it is already available for reaction with an alkali humate such as sodium humate, and it may also be reacted directly with humic acid, although the reaction is accelerated by adding some base such as sodium hydroxide to the reaction mixture to neutralize the acid which is formed as a result of the reaction, which in the particular example considered here would be hydrochloric acid. The quaternary ammonium compounds may be in their hydroxide form, of course, and may then be reacted directly with humic acid.

Additional information on the preparation of the long-chain alkyl ammonium humates used in the practice of our invention is given in our co-pending application Serial No. 95,793 of even filing date herewith entitled "Derivatives of Humic Acid," the disclosure of which is incorporated herein by reference.

The treatment of the oily liquid, viz., the petroleum oil, with the humic acid salt described hereinabove is carried out by simply mixing the selected humic acid salt in the oily vehicle, using sufficient of the humic acid compound to reduce the filter loss of the oil to the desired degree. This, of course, will vary somewhat depending upon the nature of the well drilling or treating or working conditions involved. As a general guide, however, we find that it is desirable to add enough of our long-chain ammonium humate compound to the oil so as to achieve a filter loss of not to exceed 5 cc. or less when the test is made for 30 minutes in accordance with Code RP 29 of the American Petroleum Institute. This test is well-known in the industry, and involves the use of a pressure filter of three inches diameter operating at 100 pounds per square inch. The filtrate connected in a 30-minute test is a measure of the filter loss of the fluid. Generally speaking, such a low filter loss is achieved by the use of from 2 to 20 pounds of long-chain alkyl ammonium humate per barrel of well-working fluid. Of course, for special field conditions very low filter losses may be needed, and as much as 50 pounds per barrel may then be used.

The well-working fluids made in accordance with our invention may also include the additives known to the art. These comprise weighting materials, which include finely ground clay, limestone, silica, barite, celestite, and like minerals. Where the well-working fluid is used in fracturing, propping agents such as sand, aluminum spheres, walnut shells, and the like will normally be included. Whenever incorporation of the long-chain alkyl ammonium humate to the extent needed to achieve a fluid loss equal to or less than 5 cc. does not serve to thicken the fluid as much as desired, then other known thickening agents may be used. Such thickening agents are the asphalts, particularly air-blown asphalts as described in Dawson et al. Patent No. 2,223,027; soaps such as sodium and/or calcium oleate, stearate, tallate, and the like. Water may also be readily incorporated into the well-working fluids of our invention, and serves as an inexpensive method of increasing the density of fluids whenever they are less dense than water itself. The water is taken up in the form of a water-in-oil emulsion, so that the continuous liquid phase of the fluid is still oil. Anywhere from 1% to 30% by volume of water may readily be incorporated in our fluids.

It is convenient, and generally facilitates the addition and incorporation of the long-chain alkyl ammonium humate into the oil, to provide the humate already dispersed in materials which is compatible with the fluid just made, and indeed will generally be a portion of the oil itself. Thus, a concentrate may be prepared of the humate and diesel oil in any desired weight ratio, say 1:10; and this will generally be an easier form for adding the humate. Alternatively, if a weighting material is to be used, for example, pulverized limestone, the powdered humate may be pre-mixed with the latter in, say, an 1:5 weight ratio.

We give now some working examples, of which Example 1 below sets forth the best method known to us of practicing our invention.

*Example 1*

100 grams (dry weight) of lignite from Bowman County, North Dakota, characterized by a solubility of 85% (dry weight) in sodium hydroxide solution, was added to 1 liter of water and 30 grams of sodium hydroxide added. The solution was allowed to stand over night with occasional stirring. The next day the pH was adjusted to 7.0 with sulfuric acid, and the supernatant liquid was decanted from the precipitate, which had a dry weight of about 15 grams. Separately, 90 grams of dimethyldioctadecylammonium chloride were dissolved in 200 cc. of water, and this solution was added to the decanted sodium humate solution resulting from the first step. A flocculent precipitate of dimethyldioctadecylammonium humate formed, which was separated by filtration on filter paper and washed with about 200 cc. of distilled water. The product was dried in a dessicator over calcium chloride, and ground in a mortar to pass a 60 mesh screen. The reaction product was mixed in its entirety with 200 cc. of diesel oil in a Waring Blendor for 10 minutes. This produced a concentrated dispersion of dimethyldioctadecylammonium humate in the diesel oil. This was then used to prepare oil-base drilling fluids and oil-base fracturing fluids of the type used in fracturing oil-bearing formations in order to increase the permeability thereof. For example, when the concentrate described was added to an additional quantity of diesel oil, in the proportions of 5 grams of the concentrate and 350 cc. of the diesel oil, a fluid was produced which when tested for fluid loss in accordance with the specifications of the American Petroleum Institute, Code No. 29, gave a 30 minute fluid loss of 2.6 cc., which is exceptionally low considering the low concentration of the additive present. The fluid thus prepared was usable as such as (a) an oil base drilling fluid; (b) a carrier fluid for use in formation fracturing; and (c) a packer fluid for emplacement behind the casing of a drilled well.

In the example just given, the alkyl ammonium humate used was quite pure, and free of the small amount of ash which is present in most lignite. Production costs can be lowered by proceeding in a somewhat different manner, as shown in the next example:

*Example 2*

120.5 grams of the lignite described in Example 1 above, and containing 17% moisture, were mixed with 46.5 grams water, 15.5 grams of dimethyldioctadecylammonium chloride, and 8 grams of sodium hydroxide, and ground together with a mortar and pestle for three minutes. The product was allowed to air-dry over night at room temperature. The next day it was added to diesel oil in a laboratory mixer, in the proportions of six pounds per barrel (42 U.S. gallons), and the resulting fluid was useful as such as a well-working fluid for the several uses already described herein.

*Example 3*

The process of Example 1 was carried out as described therein, except that instead of using dimethyldioctadecylammonium chloride, 85 grams of lauryl amine and 26 grams of glacial acetic acid were added to 200 cc. of water to form a solution of laurylammonium acetate. This solution was mixed with the decanted sodium humate solution to give a flocculent precipitate of laurylammonium humate which was separated, washed, dried, and ground as described in Example 1. This was then added to deodorized kerosene in the proportion of seven pounds of the alkyl ammonium humate, using a laboratory mixer, to give a well-working fluid.

*Example 4*

An alkyl ammonium humate well-fluid treating concentrate was prepared as follows: 658 pounds of the lignite described in Example 2, containing 17% moisture, was introduced into a pug mill together with 98 pounds of powdered caustic soda, 156 pounds of water, 136 pounds of commercial dimethyldi(hydrogenated tallow alkyl)ammonium chloride, and 52 pounds of diesel oil. Reaction took place to give of dimethyldi(hydrogenated tallow alkyl)ammonium humate, which was fed into a tank containing 800 pounds of additional diesel oil, where it was agitated by pumping, with the addition of 100 pounds of additional water, to give a pourable concentrate.

This concentrate was taken to a well site and mixed as follows:

| | | |
|---|---|---|
| Concentrate | lbs__ | 1330 |
| Diesel oil | bbls__ | 80 |
| Sulfurized tall oil [1] | lbs__ | 1720 |
| Caustic soda | lbs__ | 350 |
| Calcium chloride | lbs__ | 160 |

[1] Prepared by mixing 6 parts sulfur with 92 parts tall oil, heating for three hours at 275° F., cooling, and adding 25 parts kerosene.

The function of the sulfurized tall oil was to form a soap with the caustic soda and calcium chloride, which imparted the desired consistency to the "mud," or oil-base drilling fluid.

The fluid thus prepared had an API fluid loss of 0.0 cc., and a viscosity of 39 centipoises API. This fluid was used in drilling the well with a core-drill. The cores recovered showed only about ⅛″ of filtrate invasion, which was remarkably low.

We have found that the reaction of the organic bases with humic acid results in the formation of a normal salt, with the stoichiometrically equivalent quantities of the components entering thereinto. This is not to imply that only exactly stoichiometrically equivalent quantities may be used in practicing our invention. For example, if an excess of the base is used, then in addition to the alkyl ammonium humate which forms, some unreacted base will be present intermixed therewith; while if an excess of humic acid is used, the latter will be present as a diluent of the alkyl ammonium humate produced. The material which is active, however, in the practice of our invention, is the alkyl ammonium humate, and that is what we have accordingly recited in the claims which follow.

We have also found that the presence of an alkyl group (and by that term we include alkyl groups having a double bond, which are sometimes called alkenyl groups) having at least 12 carbon atoms in a straight chain is necessary to impart the property of dispersibility and indeed solubility in organic liquid systems which characterizes the products entering our invention.

While we have illustrated our invention by the use of specific ingredients, reaction conditions, and the like, it will be understood that numerous variations, equivalents, and alternatives may be employed in its practice, all within the scope of the claims which follow.

We claim:

1. In a process wherein an oil-base well-working fluid is introduced into a well wherein said fluid is subject to loss of oil by filtration, the step which comprises adding to said well-working fluid sufficient of a substituted ammonium humate in which at least one of the substituted radicals attached to the said ammonium is an alkyl radical having from 12 to 22 carbon atoms in a straight chain to effect a substantial lowering of said oil loss but insufficient to thicken said fluid so much as to render it no longer introduceable into said well.

2. The process in accordance with claim 1 in which said substituted humate is contained within said fluid at a concentration within the range of 2 to 50 pounds per barrel.

3. In a process wherein an oil-base well-working fluid is introduced into a well wherein said fluid is subject to loss of oil by filtration, the step which comprises adding to said well-working fluid sufficient of a substituted ammonium humate in which at least one of the substituted radicals attached to the said ammonium is an alkyl radical having from 12 to 22 carbon atoms in a straight chain to effect a substantial lowering of said oil loss and continuing said addition during the course of said process so as to maintain said oil loss below a preselected maximum.

4. In a process wherein an oil-base well-working fluid is introduced into a well wherein said fluid is subject to loss of oil by filtration, the step which comprises adding to said well-working fluid sufficient of a substituted ammonium humate in which at least one of the substituted radicals attached to the said ammonium is an alkyl radical having from 12 to 22 carbon atoms in a straight chain and in which those substituted radicals which do not have from 12 to 22 carbon atoms in a straight chain are chosen from the group consisting of hydrogen, alkyl radicals having fewer than 12 carbon atoms, and phenyl and benzyl, to effect a substantial lowering of said oil loss and continuing said addition during the course of said process so as to maintain said oil loss below a preselected maximum.

5. The process in accordance with claim 4 in which said maximum is 5 cc. API.

6. In a process wherein an oil-base well-working fluid is introduced into a well wherein said fluid is subject to loss of oil by filtration, the step which comprises adding to said fluid sufficient of an alkyl ammonium humate having the formula $R_1R_2R_3R_4N^+Hu^-$ in which at least one of the R's is an alkyl radical having from 12 to 22 carbon atoms in a straight chain, and in which those R's which do not have from 12 to 22 carbon atoms in a straight chain are chosen from the group consisting of hydrogen, lkyl radicals having fewer than 12 carbon atoms, and phenyl and benzyl, and in which $Hu^-$ is the anion of humic acid; to effect a substantial lowering of said oil loss but insufficient to thicken said fluid so much as to render it no longer introduceable into said well.

7. In a process wherein an oil-base well-working fluid is introduced into a well wherein said fluid is subject to loss of oil by filtration, the step which comprises adding to said fluid sufficient of an alkyl ammonium humate having the formula $R_1R_2R_3R_4N^+Hu^-$ in which at least one of the R's is an alkyl radical having from 12 to 22 carbon atoms in a straight chain, and in which those R's which do not have from 12 to 22 carbon atoms in a straight chain are chosen from the group consisting of hydrogen, alkyl radicals having fewer than 12 carbon atoms, and phenyl and benzyl, and in which $Hu^-$ is the anion of humic acid; to effect a substantial lowering of said oil loss and continuing said addition during the course of said process so as to maintain said oil loss below a preselected maximum.

8. The process in accordance with claim 7 in which said maximum is 5 cc. API.

9. A well-working fluid comprising as a major constituent an oily petroleum liquid and sufficient of a substituted ammonium humate in which at least one of the substituted radicals attached to the said ammonium is an alkyl radical having from 12 to 22 carbon atoms in a straight chain and in which those substituted radicals which do not have from 12 to 22 carbon atoms in a straight chain are chosen from the group consisting of hydrogen, alkyl radicals having fewer than 12 carbon atoms, and phenyl and benzyl, to effect a substantial lowering of the fluid loss of said well-working fluid.

10. The fluid in accordance with claim 9 in which the components of said fluid consist essentially of said liquid, said humate, a soap, a weighting agent, and water.

11. The fluid in accordance with claim 9 in which said fluid loss is not greater than 5 cc. API.

12. The fluid in accordance with claim 9 in which the said humate is present in a concentration within the range of 2 to 50 pounds per barrel.

References Cited in the file of this patent

UNITED STATES PATENTS

| | | |
|---|---|---|
| 1,999,766 | Lawton et al. | Apr. 30, 1935 |
| 2,393,273 | Wayne | Jan. 22, 1946 |
| 2,783,222 | Rahn | Feb. 26, 1957 |
| 2,876,197 | Watkins | Mar. 3, 1959 |

FOREIGN PATENTS

| | | |
|---|---|---|
| 578,341 | Canada | June 23, 1959 |
| 685,563 | Great Britain | Jan. 7, 1953 |